United States Patent
Thompson et al.

(10) Patent No.: US 10,408,172 B2
(45) Date of Patent: *Sep. 10, 2019

(54) IONIZING DEVICE FOR IMPROVING COMBUSTION ENGINE PERFORMANCE AND METHODS OF USE

(71) Applicant: OPTIMIZED FUEL TECHNOLOGIES, INC., Carlsbad, CA (US)

(72) Inventors: Robert J. Thompson, Tustin, CA (US); Roger Pawson, Carlsbad, CA (US)

(73) Assignee: OPTIMIZED FUEL TECHNOLOGIES, INC., Carlsbad, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/047,919

(22) Filed: Jul. 27, 2018

(65) Prior Publication Data
US 2018/0347516 A1 Dec. 6, 2018

Related U.S. Application Data

(63) Continuation of application No. PCT/US2017/035817, filed on Jun. 2, 2017, which is a continuation-in-part of application No. PCT/US2016/015766, filed on Jan. 29, 2016, and a continuation-in-part of application No. 15/194,193, filed on Jun. 27, 2016, now Pat. No. 9,670,887, which is a continuation of application No. PCT/US2016/015766, filed on Jan. 29, 2016.

(51) Int. Cl.
*F02M 27/04* (2006.01)
*F02M 35/024* (2006.01)
*F02M 35/10* (2006.01)
*G01M 15/10* (2006.01)
*F02D 19/06* (2006.01)
*F02D 41/14* (2006.01)

(52) U.S. Cl.
CPC .... *F02M 27/042* (2013.01); *F02M 35/02416* (2013.01); *F02M 35/10249* (2013.01); *G01M 15/104* (2013.01); *F02D 19/0689* (2013.01); *F02D 41/1454* (2013.01)

(58) Field of Classification Search
CPC ....... H01T 23/00; F20M 27/04; F02M 35/024
See application file for complete search history.

(56) References Cited

U.S. PATENT DOCUMENTS

| 9,670,887 B1* | 6/2017 | Thompson | F02M 27/04 |
| 2004/0065306 A1* | 4/2004 | Parsa | B01D 53/326 |
| | | | 123/539 |
| 2005/0238551 A1* | 10/2005 | Snyder | A61L 9/205 |
| | | | 422/186.3 |

* cited by examiner

Primary Examiner — Dharti H Patel
(74) Attorney, Agent, or Firm — Gordon Rees Scully Mansukhani LLP; Kathryn K. Hull; Howard N. Shipley (57) ABSTRACT

The disclosure herein relates to devices for improving combustion engine performance. More specifically, the present disclosure relates to ionizing devices for improving combustion engine performance. Engine improvements include, but are not limited to reducing emissions, improving fuel efficiency, improving power, and reducing engine noise in combustion engines that utilizes a computer to control the air/fuel mixture.

19 Claims, 9 Drawing Sheets

IONIZING DEVICE FOR IMPROVING COMBUSTION ENGINE PERFORMANCE AND METHODS OF USE

CROSS-REFERENCE TO RELATED APPLICATIONS

This application is a continuation of International Application number PCT/US2017/035817, filed Jun. 2, 2017, which is a continuation in part of International Application number PCT/US2016/015766, filed Jan. 29, 2016, and entitled "Ionizing device for improving combustion engine performance and methods of use." This application is also a continuation of International Application number PCT/US2017/035817, filed Jun. 2, 2017, which is a continuation in part of U.S. application Ser. No. 15/194,193, filed Jun. 27, 2016, now U.S. Pat. No. 9,670,887, issued Jun. 6, 2017, and entitled, "Ionizing device for improving combustion engine performance and methods of use," which is a continuation of International Application number PCT/US2016/015766, filed Jan. 29, 2016, and entitled "Ionizing device for improving combustion engine performance and methods of use." The entire contents of all related applications are hereby incorporated by reference.

TECHNICAL FIELD

The disclosure herein relates to devices for improving combustion engine performance. More specifically, the present disclosure relates to ionizing devices for reducing emissions, improving fuel efficiency, and improving power in combustion engines that utilize a computer to control the air/fuel mixture.

BACKGROUND

Combustion engines convert the energy generated from fuel combustion into mechanical power. When the fuel source is carbon based, such as gasoline or diesel, the combustion is often incomplete resulting in the emission of hydrocarbons, nitrogen oxide, carbon monoxide, sulphur dioxide, ozone, and other chemical by-products. Because emissions from combustion engines contribute to air pollution that may be harmful to humans, animals, and the environment, many countries have regulations that restrict emissions. While technology has improved emissions over the decades, there is still a need for further improvement.

SUMMARY

The following simplified summary provides a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented below.

The disclosure herein is directed to an ionizing device. In one embodiment is an ionizing device having a housing unit, an electrode, an air intake port, an air outtake port, a third port, and a power source connector. In some embodiments the housing unit may be multiple pieces that attach together. In one embodiment, the housing unit may be two pieces, a bowl and a cap. The bowl and cap may be connected using a variety of different methods such as external and internal threading, slip joint, etc. In some embodiments, the bowl and cap may be held together using permanent or semi-permanent methods such as welding, gluing, epoxying, Locktight® threadlocker, etc. Generally, the bowl and cap each have an internal and external surface. An electrode may be attached to the internal surface of the cap. The electrode also has an internal and external surface. In some embodiments, a portion of the electrode may be covered with a metal oxide coating. In one embodiment, the external surface of the electrode is coated with a metal oxide coating. In another embodiment, the internal surface is coated with a metal oxide coating. In yet another embodiment, both the internal and external surface is coated with a metal oxide coating. The housing unit may also include at least one port. In one embodiment, the housing unit includes at least two ports. In another embodiment, the housing unit includes at least three ports. At least one of the ports may be an air intake port. At least one of the ports may be an air outtake port. A power source connector may be included. The power source connector connects the electrode to a power source. In one embodiment, the power source connector may be a wire. In another embodiment, the power source connector may pass through the third port in the cap. In another embodiment, the power source connector attaches to the device through the third port using a male/female connector. In another embodiment, the power source connector may be connected to the positive terminal of a power source. The power source may be a battery.

In another embodiment, the device may include a signal system to allow a user or technician to quickly determine if the device has properly installed or if the device has been tampered with.

The electrode may be made from a conductive metal or metal alloy. In one embodiment, the above described electrode may be made from copper or a copper based metal alloy. In another embodiment, the above described electrode may be made from brass. In another embodiment, the above described electrode may be made from bronze. In another embodiment, the above described electrode may be made from a conductive sintered metal or metal alloy. In another embodiment, the above described electrode may be made from a sintered copper or sintered copper based metal alloy. In another embodiment, the above described electrode may be made from a sintered bronze. In another embodiment, the above described electrode may be made from a sintered brass. In one embodiment, the above described electrode may be made from a conductive mesh. In another embodiment, the above described electrode may be made from a conductive micromesh. In one embodiment, the micromesh may be less than 100 microns. In another embodiment, the micromesh maybe less than 50 microns. In another embodiment, the micromesh may be less than 40 microns. In another embodiment the micromesh may be less than 30 microns. In another embodiment, the micromesh may be less than 20 microns. In another embodiment, the micromesh may be less than 10 microns. In another embodiment, the micromesh may be less than 5 microns.

The metal oxide coating may be based on the material of the electrode. In this embodiment, the electrode is partially or fully covered with an oxidizing chemical to yield the metal oxide coating. In another embodiment, the metal oxide is based on a different metal than the electrode. In this embodiment, the metal oxide may be based on aluminum, silver, titanium, magnesium, zinc, copper, nickel, gold, tin, chromium, tungsten, molybdenum, lithium, or palladium. In one embodiment, the metal oxide may be aluminum oxide. In another embodiment, the metal oxide may be silver oxide. In another embodiment, the metal oxide may be magnesium oxide. In another embodiment, the metal oxide may be zinc oxide. In another embodiment, the metal oxide may be copper oxide. In another embodiment, the metal oxide may be nickel oxide. In another embodiment, the metal oxide may be gold oxide. In another embodiment, the metal oxide may be tin oxide. In another embodiment, the metal oxide may be chromium oxide. In another embodiment, the metal oxide may be tungsten oxide. In another embodiment, the metal oxide may be molybdenum oxide. In another embodiment, the metal oxide may be lithium oxide. In another embodiment, the metal oxide may be palladium oxide. In one embodiment, the metal oxide may be applied as a powder. In another embodiment, the metal oxide may be applied as a liquid formulation. In this embodiment, additional chemicals may be added to the liquid metal oxide formulation such as solvents, acids, oxidizers, salts, or coloring agents. In another embodiment, the additional chemicals may include sodium diacetate, hydrogen peroxide, acetoagetanilide or heterocyclic compounds.

The power source connector may be a conductive material that is insulated such as a cable or wire. In one embodiment, the wire may be of sufficient gauge to conduct at least 5 amps of power. In another embodiment, the wire may be of sufficient gauge to conduct at least 7 amps of power. In another embodiment, the wire may be of sufficient gauge to conduct at least 10 amps of power. In another embodiment, the wire may be of sufficient gauge to conduct at least 12 amps of power. In another embodiment, the wire may be of sufficient gauge to conduct at least 15 amps of power. In another embodiment, the wire may be of sufficient gauge to conduct at least 17 amps of power. In another embodiment, the wire may be of sufficient gauge to conduct at least 20 amps of power. In another embodiment, the wire may include a fuse or circuit breaker to prevent overload.

The housing unit of the above described device may be made from a number of different materials such as glass, plastic, resins, metal, or a metal alloy. When the housing unit is made from a metal or metal alloy, the electrode is generally insulated from the housing unit.

The locations of the ports described above can vary. In one embodiment, the air intake port and air outtake port are located circumferentially opposite each other on the cap. In another embodiment, the air intake port and air outtake port are located on the same circumferential plane, but are less than 180° apart. In another embodiment, the air intake port and air outtake port may are located on different planes of the cap. In another embodiment, the air intake port may be located on the cap and the air outtake port may be located on the bowl. In another embodiment, the air intake port may be located on the bowl and the air outtake port may be located on the cap. The third port may be located at any place on the housing unit.

Various connectors may be attached to the air intake or air outtake ports of the above described device. The connectors may be used to install the device. In one embodiment, the connector may be made from a metal or metal alloy. In another embodiment, the connector may be made from a plastic. The connectors may be used to attach an air filter to the device. Alternatively, the connectors may be used to attach a vacuum line to the device.

A mounting bracket may be attached to the above described device. In one embodiment, the mounting bracket may be attached to the exterior surface of the cap. In another embodiment, the mounting bracket may be attached to the exterior surface of the bowl.

The above described ionizing device may be installed on a combustion engine that has an electronic control unit that can adjust various aspects of the combustion cycle such as the fuel/air mixture or ignition timing. The device may be installed by (1) attaching the device to an engine compartment; (2) attaching the air outtake port to a vacuum line that feeds into the engine via a fitted connector; (3) attaching the air intake port to an air filter via a fitted connector; (4) attaching the power source connector to the positive terminal of a battery; and (5) grounding the device. The device may also be installed by (1) attaching the device to an engine compartment; (2) attaching the air intake and air outtake port to a forced air line that feeds into the engine; (3) attaching the power source connector to the positive terminal of a battery; and (4) grounding the device. In one embodiment, a mounting bracket may be used to attach the device to the engine compartment. In another embodiment, the mounting bracket may be attached to the exterior surface of the cap. In another embodiment, the mounting bracket may be used to ground the device. Often, the device is attached to a vacuum line that has a constant flow.

Installation of the device may improve engine emissions, fuel efficiency, and engine performance. Installation of the device may also reduce engine deposits. Installation of the device on a combustion engine may improve engine emissions by reducing levels of hydrocarbons, carbon monoxide, nitrogen oxides, or particulate matter. Installation of the device on a combustion engine may increase fuel efficiency by at least 10% or by at least 15% or by at least 20% or by at least 25% or by at least 30% or by at least 35% or by at least 40% or by at least 45% or by at least 50%. Installation of the device on a combustion engine may improve engine performance by reducing turbo lag. Installation of the device on a combustion engine may increase the power output of the engine. Installation of the device may reduce engine noise.

DETAILED DESCRIPTION

In a combustion engine, an oxidizer and fuel are mixed together and ignited. The force of the resulting explosion is harnessed to drive mechanical movement. Most combustion engines utilize the oxygen in ambient air as the oxidizer since it is freely available. Ambient air is composed mainly of nitrogen (~78%), oxygen (~21%), Argon (~0.9%), carbon dioxide (~0.03%) and water vapor (~0.004%). Using ambient air often results in incomplete combustion of the fuel as well as harmful nitrogen based by-products due to the complexity of the hydrocarbons in the fuel source and the excess nitrogen as compared to oxygen in ambient air. Newer combustion engines incorporate an engine control unit (ECU) that controls the amount of fuel to inject based on the amount of air entering the engine and the amount of oxygen in the exhaust. In general the ration of air to fuel is generally 12 to 18 parts air (by weight) to one part fuel (by weight) with a ratio of 14.7:1 being the calculated stoichiometric ratio where 100% of the fuel and oxygen are consumed. The combustion of fuel results in water vapor, carbon dioxide, carbon monoxide, partially burned hydrocarbons, various nitrogen oxides (NOx) and other chemical byproducts, much is which is harmful to people, animals, and the environment.

Ionization is the process of adding or removing electrons from a neutral atom or molecule. Plasma is a gas that is electrically neutral but composed of ions. Ionization of ambient air will mainly be composed of nitrogen and oxygen based ions (e.g. $N^{3+}$, $O^{2-}$) since nitrogen and oxygen are the main components of ambient air. Ionized air will also include a smaller amount of hydrogen ions (i.e. $H^+$) due to the ionization of any water vapor in the air. Ionization of ambient air may result in the formation of plasma, which is a gas that is electrically neutral but composed of ions. In general, ions are more reactive than their neutral counter parts.

This disclosure is directed to a device that is capable of ionizing air. The device may be installed and used with any combustion engine (e.g., gas or diesel) that has an engine control unit (ECU). The device introduces ionized air or plasma into a combustion engine. Introduction of ionized air in a combustion chamber results in (A) an increase in fuel efficiency, (B) a reduction in harmful emissions, (C) increased power output, and (d) reduced engine noise.

When the terms "one," "a," or "an" are used in this disclosure, they mean "at least one" or "one or more," unless otherwise indicated.

Figure 1:
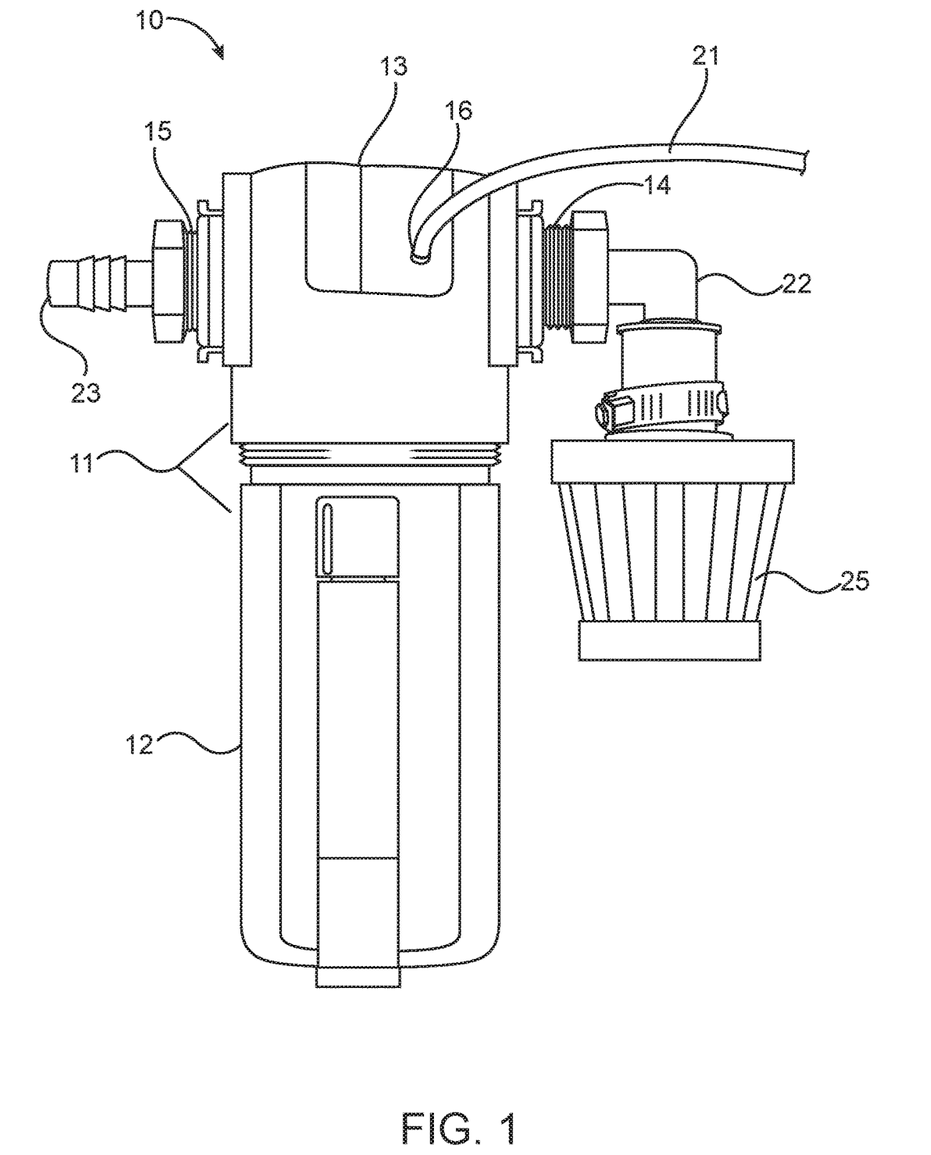
FIG. 1 is a side view of the exterior of a non-limiting embodiment of the ionizing device.

FIG. 1 illustrates an exemplary embodiment of an ionization device (10), which is encased in a housing unit (11). The housing unit may be one continuous surface or may be multiple pieces that are connected together either permanently or removably. The housing unit has an interior surface and an exterior surface. In one embodiment, the housing unit may be constructed from metal. The metal may be coated to prevent corrosion. In other embodiments, the housing unit may be constructed from plastic or composite materials. As shown in FIG. 1, the housing unit (11) may include a bowl (12) and a cap (13). The bowl (12) and the cap (13) each have an interior surface and an exterior surface. The cap and bowl may be attached using internal and external threading located on the cap and bowl, respectively.

Figure 8:
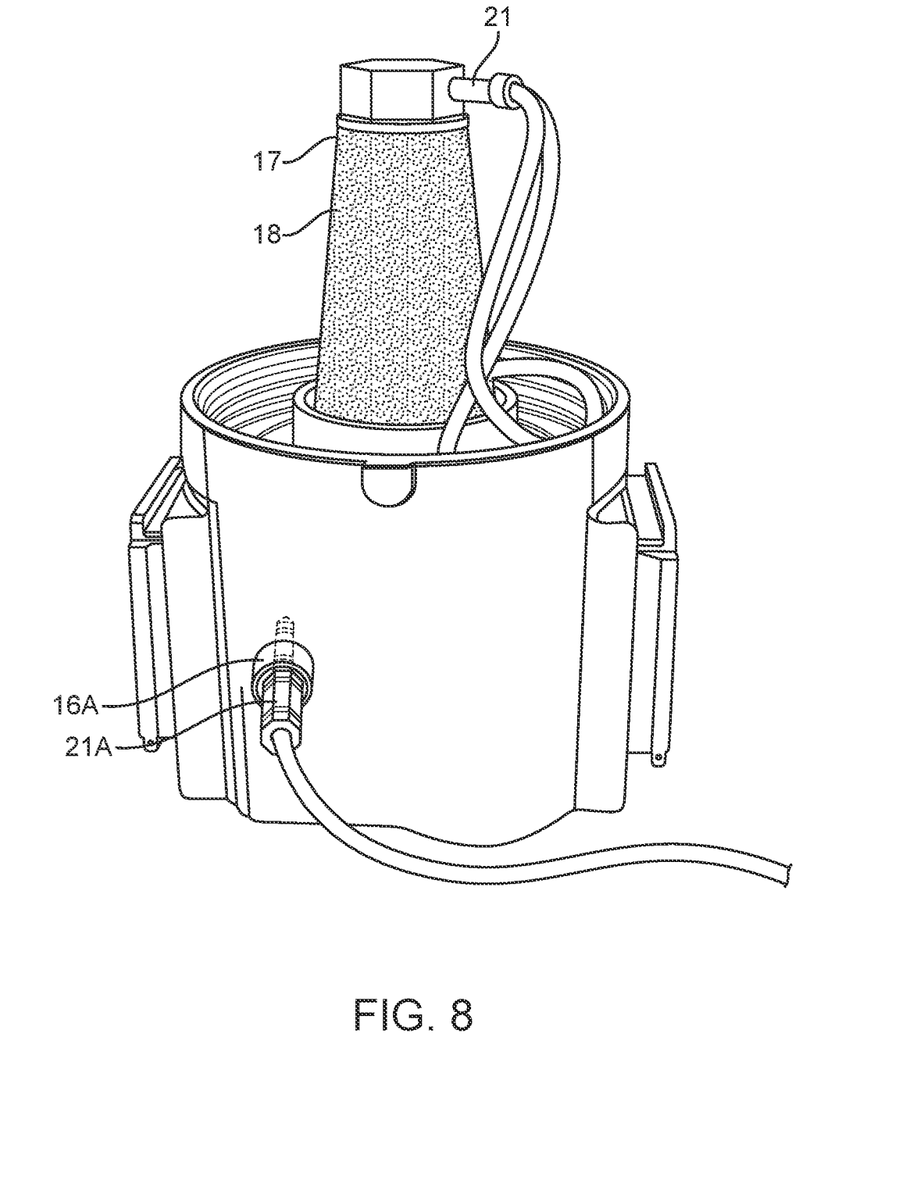
FIG. 8 is a perspective view of the interior of a non-limiting embodiment of the ionizing device

The housing unit may include multiple ports (14, 15, 16), which may be arranged in various configurations. A first port (14) may be provided for air intake. A second port (15) may be for air to be emitted or exhausted from the ionization device. A third port (16) may be to allow for a power supply to be provided to the device. A cord, wire or harness may be provided to carry power from a power supply to a power connector (21) that connects the power to an electrode (17). As shown in the figures, the air intake port (14) and the air outtake port (15) are located on opposite circumferential sides of the cap (13) and the wire port (16) is located approximately mid-distance between the air intake port (14) and the air outtake port (15). The ports may be located in alternative locations depending on the engine configuration. In one embodiment, the ports may be flush with the exterior surface of the housing unit. In another embodiment, the ports may extend outwardly from the exterior surface of the housing unit. In yet another embodiment, the ports may extend inwardly from the exterior surface of the housing unit. When the ports extend outwardly or inwardly, they may be tapered (e.g. conical shaped) or straight (e.g. cylindrical shaped). In yet another embodiment, the third port may be an adaptor or connector to which the wire attaches. For example, but not limited to, the third port (16A) may be a male/female connector as illustrated in FIG. 8. In this embodiment, the third port (16A) is the female half of the connector and the wire (21A) has a matching male end.

Figure 2:
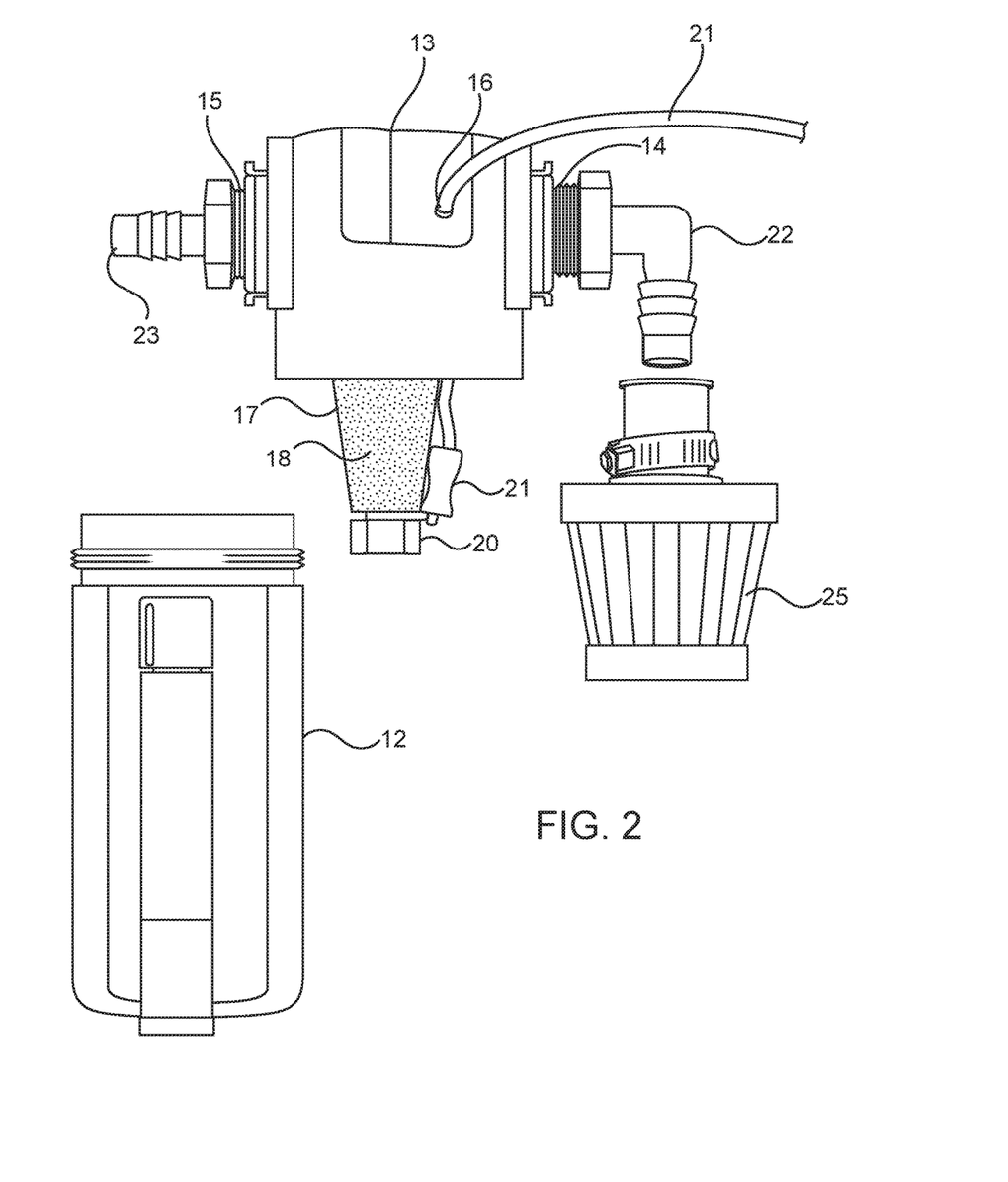
FIG. 2 is a side view of the interior of a non-limiting embodiment or the ionizing device.
Figure 3:
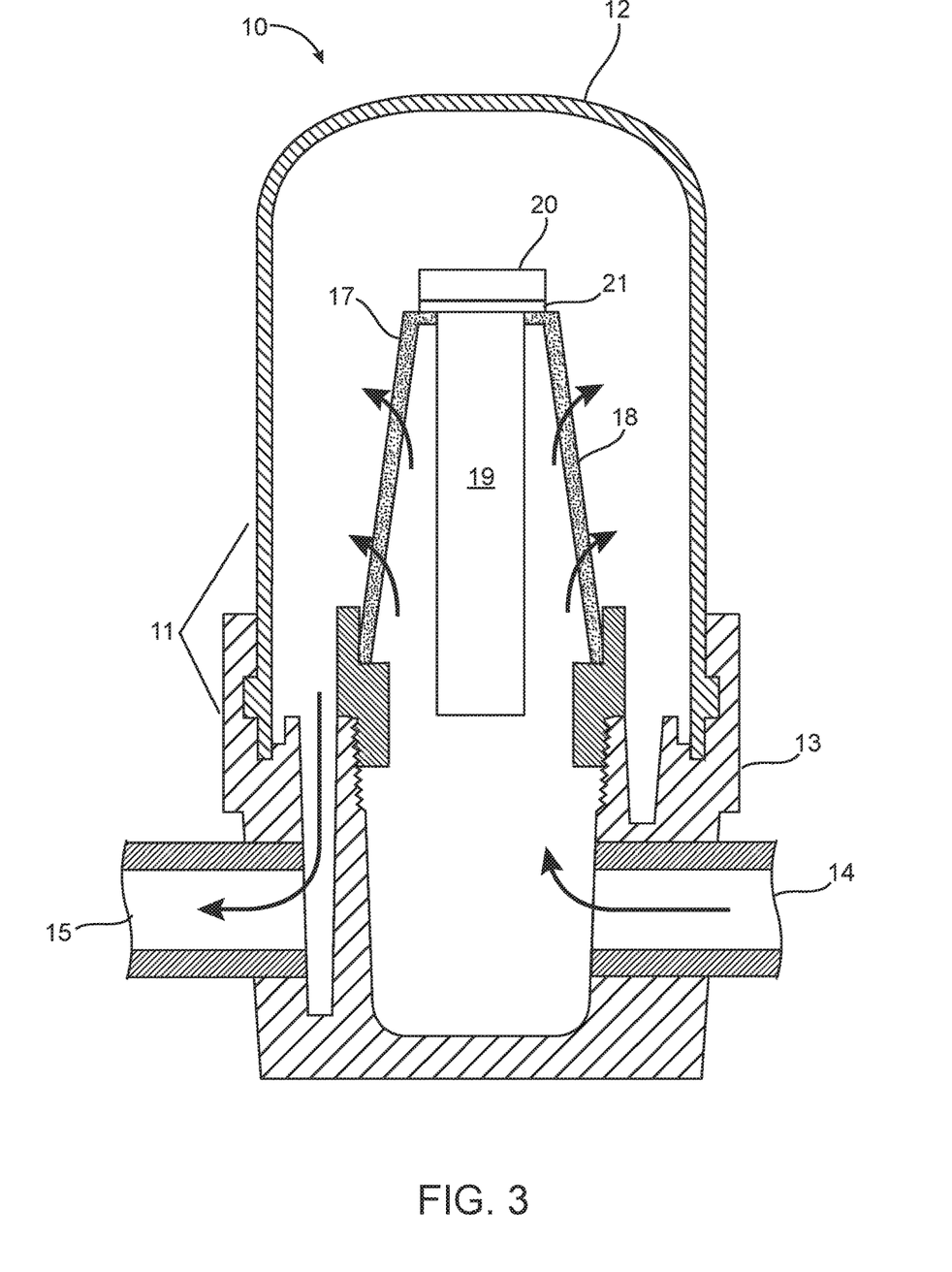
FIG. 3 is a cross-sectional side view of a non-limiting embodiment of the ionizing device.
Figure 4:
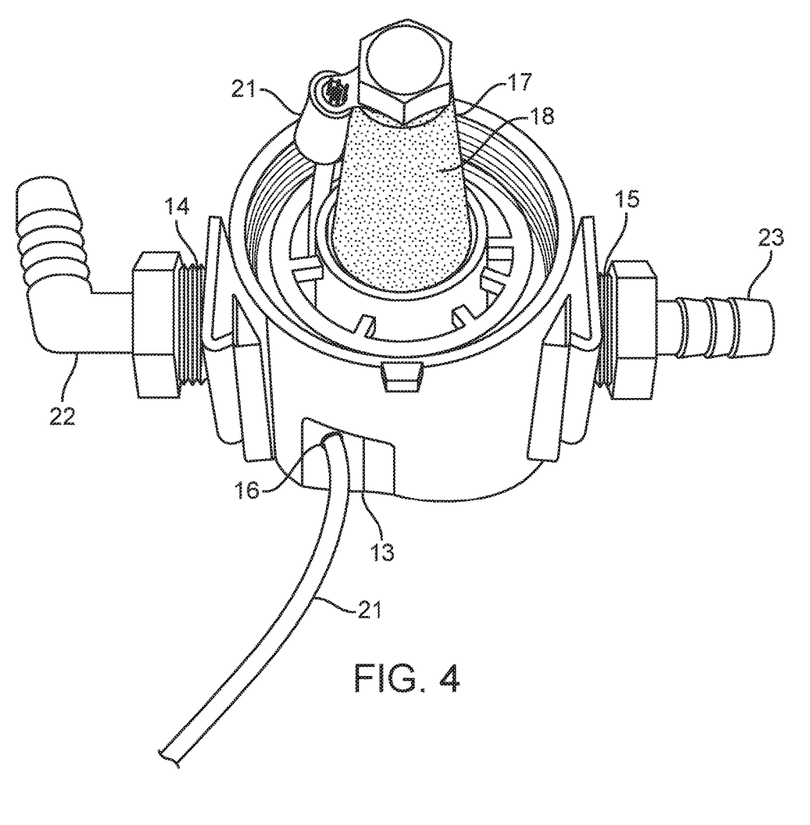
FIG. 4 is a perspective view of a non-limiting embodiment of the ionizing device.

A view of the housing unit of FIG. 1 with the cap (13) removed from the bowl (12) is shown in FIG. 2 and FIG. 4. Connected to the interior surface of the cap (13) of the housing unit (11) is the electrode (17). The electrode (17) may be attached using a material that insulates electrode (17) from the interior surface of cap (13). The shape of the electrode (17) is depicted as frustoconical in FIG. 2, however, the shape may be any cylindrical or polygonal based shape. In the embodiment depicted in FIG. 3, the electrode (17) has an interior surface and an outer surface and is shell-like or alternatively has a portion hollowed out in the interior. The electrode (17) is made from a conductive material. In an exemplary embodiment electrode (17) is a metal based micromesh. The metal micromesh filter may be configured with openings less than 100 microns or less than 75 microns, or less than 50 microns, or less than 40 microns, or less than 30 microns, or less than 20 microns, or less than 10 microns, or less than 5 microns. In another embodiment, the electrode is made from a bronze material. In another embodiment, the bronze material may be a sintered bronze material. In yet another embodiment, the sintered bronze material may be porous. The electrode (17) may also be coated (inside surface, outside surface, or both surfaces) with an oxide or a metal oxide (18). For example, coating an aluminum electrode with an oxidizing chemical results in a coating of aluminum oxide forming on the surface of the electrode. Alternatively, the metal oxide may be based on a metal that is different from the electrode. Non limiting examples of metal oxides includes those based on aluminum, silver, titanium, magnesium, zinc, copper, nickel, gold, tin, chromium, tungsten, molybdenum, lithium, and palladium. In one embodiment, the metal oxide is applied in a powdered form. In another embodiment, the metal oxide is applied in a liquid form. In the liquid form, additional chemicals may be added to make a metal oxide formula. Non-limiting examples of additional chemicals include solvents, acids, oxidizers, salts, and coloring agents. In one embodiment, the additional chemicals added to the liquid metal oxide formula may include sodium diacetate, hydrogen peroxide, acetoagenanilide, and heterocyclic. As depicted in FIG. 3, a threaded post (19) is attached to the interior of the cap (13) and passes though the length of the electrode (17). A nut (20) attaches to the non-cap end of threaded post (19) to hold the electrode (17) in place.

Attached to the top of the electrode (17) is a power connector (21) that connects the electrode (17) to, for example, the wire carrying power from a power source. The power connector (21) is held in place by nut (20). The power connector (21) should be of sufficient gauge and material to conduct amperage ranging from 5 milliamps to 20 milliamps. In one embodiment, a fuse or circuit breaker may be used to prevent the current/voltage being carried by the wire and connector from exceeding the rated capacity of the electrode, wire and connector.

Figure 5:
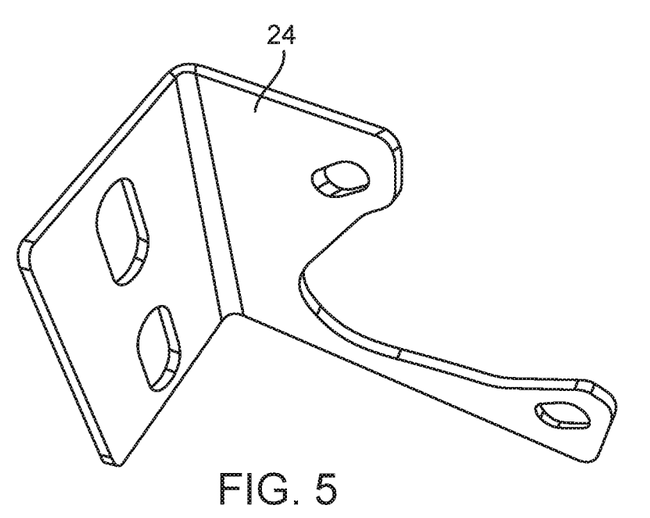
FIG. 5 is a perspective view of a non-limiting embodiment of mounting bracket.
Figure 6:
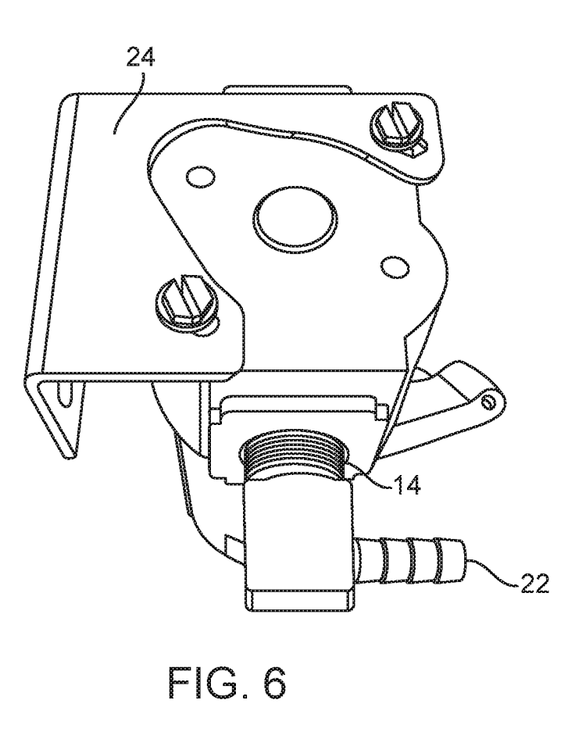
FIG. 6 is a perspective view of a non-limiting embodiment of the ionizing device.
Figure 7A:
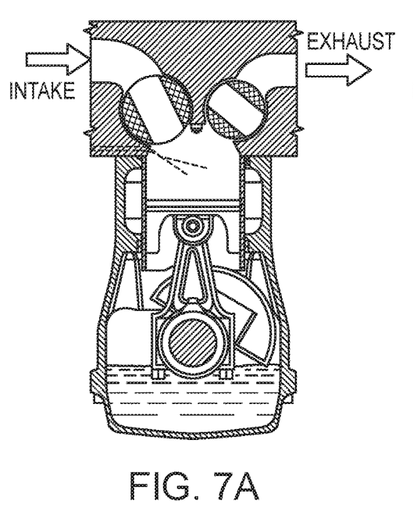
FIGS. 7A, B, C, and D are an overview of a combustion engine cycle.
Figure 7B:
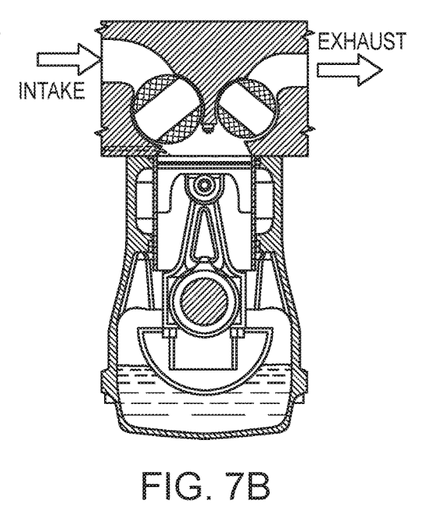
Figure 7C:
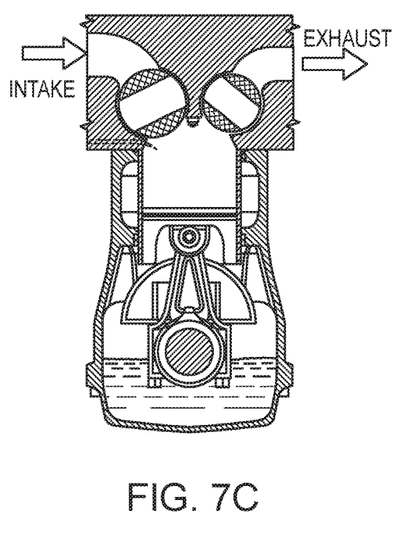
Figure 7D:
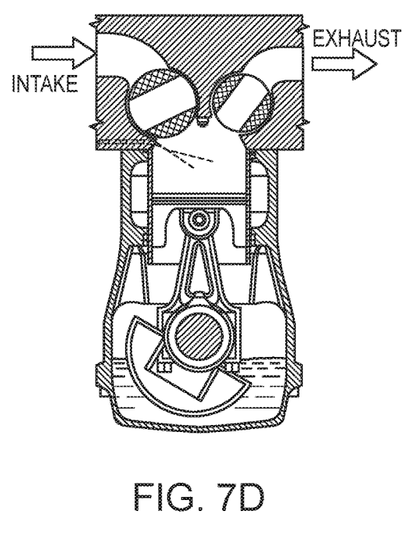

A pair of connectors (22 and 23) may be connected to the intake and exhaust ports (14, 15). The connectors facilitate the connection of hose, pipes or other fluid carrying structures to the ionizing device. For example, the connector (22) may connect an air filter (25) to the port (14). Also, the connector (23) may be connected to a vacuum line. FIG. 5 illustrates one embodiment of a mounting bracket (24) that may be provided for mounting the ionizing device with the engine. FIG. 6 illustrates how the mounting bracket (24) may be attached to the outer surface of the cap. In this embodiment, mounting bracket (24) may also be used to ground the ionizing device when the device is installed in an engine.

Figure 9:
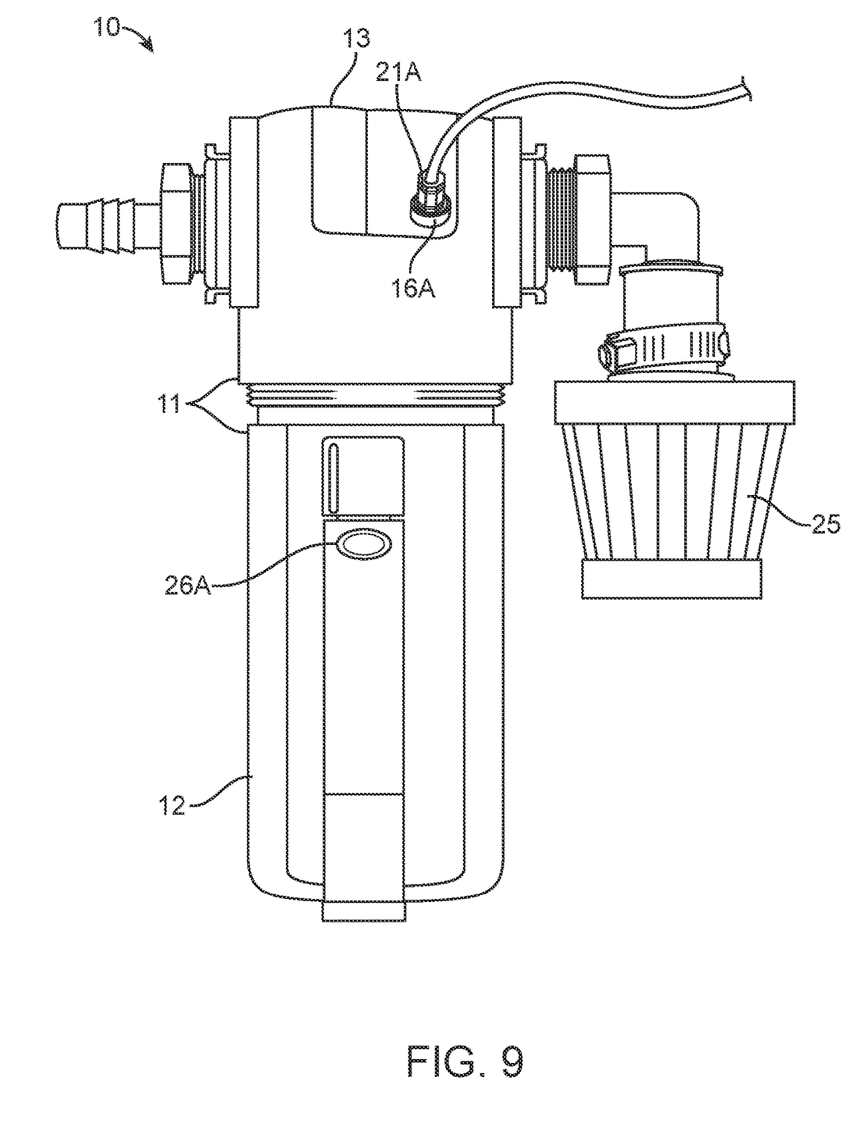
FIG. 9 is a side view of a non-limiting embodiment of the ionizing device.
Figure 10:
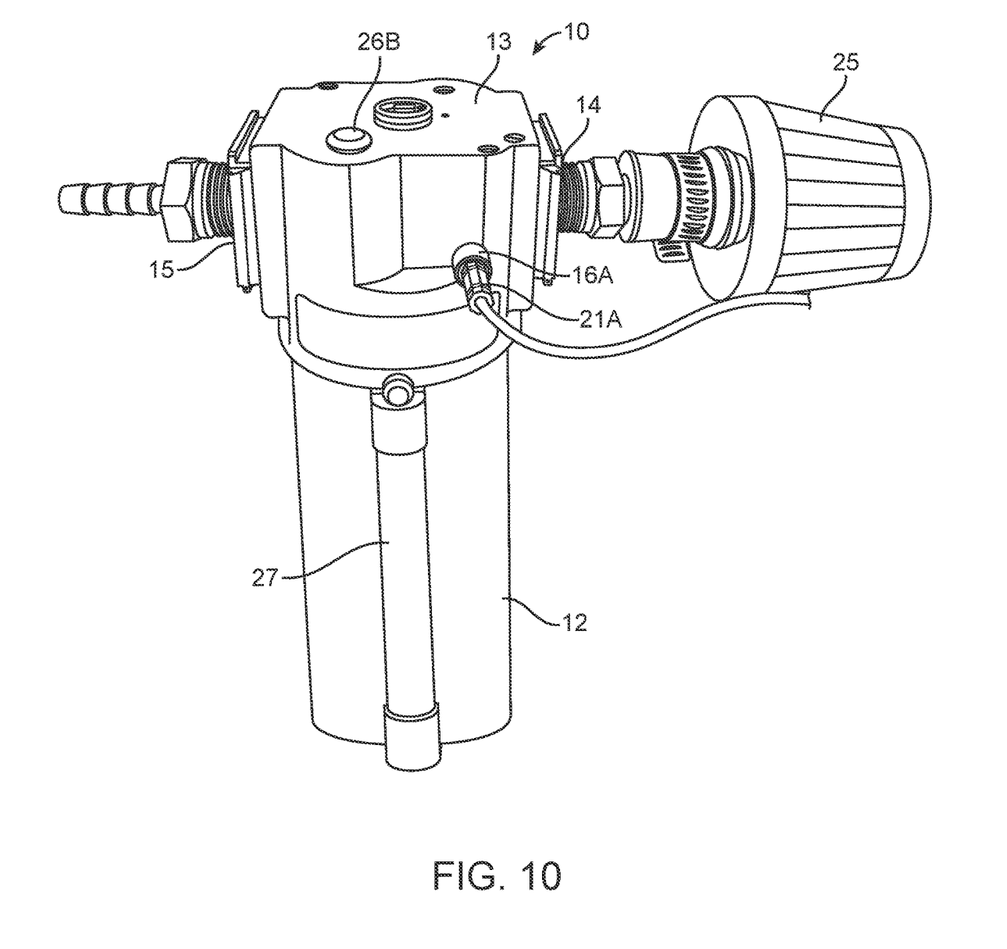
FIG. 10 is a side view of a non-limiting embodiment of the ionizing device

In another embodiment, the device includes a least one signaling system to ensure that the device is properly installed or that the device has not been tampered with. FIG. 9 and FIG. 10 illustrate non-limiting embodiments incorporating a light (26A and 26B) to ensure that the device has been properly installed. In these embodiments the light is integrated into the circuitry such that when the device receives power from a power source, the light turns on. This enables a user or technician to quickly ascertain if the device is properly installed. FIG. 10 illustrates a non-limiting embodiment incorporating a tamper resistant feature using chamber (27). In this embodiment, the chamber (27) is made from a transparent material (e.g. glass, plastic, etc.), is filled with a liquid or gel, and is semi-permanently sealed such that opening the device also opens the chamber, thus releasing the liquid or gel contained inside.

The ionizing device disclosed herein may be installed on any combustion engine with an ECU. The ionizing device disclosed herein may be sized up or down to allow installation on a variety of engines. In particular engines used in motorized vehicles such as, for example, motorcycles, passenger automobiles, delivery trucks, heavy machinery, generators out board motor boats, and recreation vehicles such as quads, jet skis, etc. The ionizing device (10) is attached to any stable vacuum line (via the connector (23) and the port (15)) that feeds into the engine. The vacuum line is preferably free of check valves as check valves will disrupt the air flow into the device, reducing its functionality. The power connector (21), e.g. wire, is attached to the vehicle's power supply such as, for example, the output of an alternator or generator of the positive end of the engine battery. As mentioned above, a fuse may be provided to protect the ionizing device and related wiring from an overloading condition. The ionizing device (10) may be mounted to the frame of the engine compartment using mounting bracket (24), preferably in direct contact with metal in order to ground the device. If mounting bracket (24) does not have direct contact with metal, then a grounding wire may be provided.

Larger diesel engines have air compressors that pump extra air into the truck to be used in the engine, brakes, or horn. In these engines, the ionizing device (10) can also be attached to a forced air that feeds into the engine line via connector 22 and port 14. In this embodiment, filter 25 is not used.

During operation, when the engine is running, power from the vehicle electrical system energizes electrode (17). The vacuum line pulls ambient air through air filter (25) and into the device though port (14) and into the interior of electrode (17). The air travels from the interior to the exterior of electrode (17). As the air passes through electrode (17) the electricity ionizes the air creating a plasma. The plasma exits the ionizing device via outtake port (15) and enters the vacuum line feeding into the engine. The plasma mixes with additional air and fuel and is injected into a combustion chamber. The ECU adjusts the fuel/air mixture to account for the presence of the plasma.

A simplified overview of the mechanics of a combustion engine is depicted in FIGS. 7A, 7B, 7C, and 7D as follows: (7A) Intake of air and fuel in the combustion chamber, (7B) Compression of the air and fuel, (7C) Combustion of the fuel, and (7D) Emission of exhaust out of the combustion chamber. The mechanics varies slightly for diesel engines: (7A) Intake of air, (7B) Compression of air, (7C) injection and Combustion of the fuel, and (7D) Emission of exhaust. During the combustion cycle, up to 35% of the fuel injected is unspent. Accordingly, the majority of harmful engine emissions such as carbon monoxide, NOx, hydrocarbons, and particulate matter, occur because of combustion inefficiency. Incorporating a small amount of plasma into the air/fuel mixture increases the combustion efficiency, such that up to 100% of the fuel is burned. Having a more complete burn of the fuel changes the engine emissions to water vapor, carbon dioxide, and oxygen.

It is believed that ionized air contributes to a more complete combustion of the fuel by: (A) mixing more thoroughly with the fuel, (B) breaking down the long hydrocarbons chains and clusters, (C) increasing the levels of oxygen in the fuel mix, and (D) adding hydrogen into the fuel mix. Additionally, it is believed that ionized air helps reduce emissions by: (A) inhibiting the formation of NOx by lowering the peak combustion temperatures, (B) reducing the amount of unburnt fuel, and (C) oxidizing unburned hydrocarbons and carbon monoxide. Lastly, it is believed that ionized air increases fuel efficiency and power output by: (A) taking advantage of the ECU's capability to automatically adjust the air/fuel mix to a more lean mixture based on sensor readings, (B) creating a faster burn, (C) having a cleaner burn, and (D) having a higher flame speed due to the incorporation of small amounts of hydrogen.

In addition, vehicles including engines equipped with the ionizing device disclosed herein may exhibit improved performance such as the (A) increased engine power output, (B) minimization or elimination of the lag time associated with the throttle response in turbo charged engines, (C) smoother engine performance, and (D) reduced engine noise.

The ionizing device disclosed herein may be configured to be compatible with a variety of machines that have combustion engines with ECUs. Non-limiting examples include motorcycles, vehicles (both passenger and delivery), boats (both outboard and inboard motors), generators, construction machinery, and airplanes. The device may be used with combustion engines that use a hydrocarbon based fuel source such as diesel or gasoline.

EXAMPLES

The examples disclosed herein illustrate improved engine performance in vehicles with the disclosed ionizing device installed.

Example 1—2015 Toyota Tundra, Eight Cylinders with Six Inch Lift Kit and Knobby Tires In this example, an ionizing device as described herein was installed in a 2015 Toyota Tundra. The truck was fitted with a six inch lift kit and knobby off-road tires. Engine performance was evaluated based on fuel efficiency and emissions content. A comparison of the engine performance with and with the ionizing device is shown in Table 1 below.

TABLE 1

Performance Evaluation with Toyota Tundra

|  | Without Device | With Device |
| --- | --- | --- |
| Hydrocarbons (HC) | 0.004 | 0.002 |
| Carbon monoxide (CO) | 0.120 | 0.086 |
| Carbon dioxide ($CO_2$) | 578.430 | 587.70 |
| Oxygen ($O_2$) | | |
| Nitrogen oxides (NOx) | 0.010 | 0.0009 |
| Fuel efficiency (miles per gallon) | 8.8 city/11 highway* | 15.1 city/21 highway |

*The fuel efficiency was based on the dashboard reading post-test after driving the vehicle for about 15 miles.

The results in Table 1 show an appreciable improvement in fuel efficiency and emissions.

Example 2—2015 Volkswagen Passat 2.0 TDI

In this example, an ionizing device as described herein was installed on a 2015 Volkswagen Passat TDI. This car was manufactured with software that modified emissions when testing mode was detected (e.g. only two wheels moving). Due to the software issues, the vehicle was evaluated by measuring emissions from the tail pipe while the vehicle was idling.

TABLE 2

Performance Evaluation with Volkswagen Passat 1

| Percentage or PPM | Without Device | With Device |
| --- | --- | --- |
| Hydrocarbons (HC) | 8 | 7 |
| Carbon monoxide (CO) | 0.01 | 0.01 |
| Carbon dioxide ($CO_2$) | 3.5 | 4.0 |
| Oxygen ($O_2$) | 15.2 | 14.5 |
| Nitrogen oxides (NOx) | 72 | 0 |
| Fuel efficiency (miles per gallon) | N/A | N/A |

The results in Table 2 show an appreciable improvement in the NOx emissions. Additionally drivers reported an elimination of the "turbo lag" when the ionizing device was installed.

Example 3—2015 Volkswagen Passat 2.0 TDI

In this example, an ionizing device as described herein was installed on a different 2015 Volkswagen Passat TDI. This car was manufactured with software that modified emissions when testing mode was detected (e.g. only two wheels moving). Due to the software issues, the vehicle was evaluated by measuring emissions from the tail pipe while the vehicle was on a dynamometer. The fuel efficiency was calculated based on the distance traveled on the dynamometer. This emissions testing mimicked the testing standards of the California Air Resources Board.

TABLE 3

Performance Evaluation with Volkswagen Passat 2

| Grams per Mile | Without Device | With Device |
| --- | --- | --- |
| Hydrocarbons (HC) | 0.018 | 0.006 |
| Carbon monoxide (CO) | 0.054 | 0.028 |
| Carbon dioxide ($CO_2$) | 268.47 | 186.16 |
| Oxygen ($O_2$) | | |
| Nitrogen oxides (NOx) | 0.641 | 0.005 |
| Fuel efficiency (miles per gallon) | 38.51 | 55.55 |

The results in Table 3 show an appreciable improvement in the NOx emissions. Additionally drivers reported an elimination of the "turbo lag" when the ionizing device was installed.

Example 4—2013 Volkswagen Golf TDI

In this example, an ionizing device as described herein was installed on a 2013 Volkswagen Golf TDI with about 46,000 miles. This car was manufactured with software that modified emissions when testing mode was detected (e.g. only two wheels moving). Due to the software issues, the vehicle was evaluated by measuring emissions from the tail pipe.

TABLE 4

Performance Evaluation with Volkswagen Golf

| Percentage or PPM | Without Device | With Device |
| --- | --- | --- |
| Hydrocarbons (HC) | 9 | 5 |
| Carbon monoxide (CO) | 0.00 | 0.01 |
| Carbon dioxide ($CO_2$) | 4.2 | 4.2 |
| Oxygen ($O_2$) | 14.5 | 14.3 |
| Nitrogen oxides (NOx) | 50 | 23 |
| Fuel efficiency (miles per gallon) | N/A | N/A |

The results in Table 4 show an appreciable improvement in the NOx emissions. Additionally drivers reported an elimination of the "turbo lag" when the ionizing device was installed.

Example 5—2014 Ford Transit Connect

In this example, an ionizing device as described herein was installed on a 2014 Ford Transit Connect with a 2.5 liter engine. The vehicle was evaluated using a dynamometer.

TABLE 5

Performance Evaluation with Ford Transit Connect

|  | Without Device | With Device |
| --- | --- | --- |
| Hydrocarbons (HC) | 6 | 0 |
| Carbon monoxide (CO) | 0.01 | 0.01 |
| Carbon dioxide ($CO_2$) | 14.7 | 14.4 |
| Oxygen ($O_2$) | 0.3 | 0.5 |
| Nitrogen oxides (NOx) | 0 | 0 |
| Fuel efficiency (miles per gallon) | N/A | N/A |

The results in Table 5 show an appreciable improvement in the amount of hydrocarbons.

Example 6—2014 Ford Transit

In this example, an ionizing device as described herein was installed on a Ford Transit with a 3.7 liter engine. The vehicle was evaluated using a dynamometer.

TABLE 6

Performance Evaluation with Ford Transit

|  | Without Device | With Device |
| --- | --- | --- |
| Hydrocarbons (HC) | 0 | 0 |
| Carbon monoxide (CO) | 0.1 | 0 |
| Carbon dioxide ($CO_2$) | 14.8 | 14.6 |
| Oxygen ($O_2$) | 0.2 | 0.5 |

TABLE 6-continued

Performance Evaluation with Ford Transit

|  | Without Device | With Device |
|---|---|---|
| Nitrogen oxides (NOx) | 0 | 0 |
| Fuel efficiency (miles per gallon) | N/A | N/A |

The results in Table 6 show an appreciable improvement in reducing carbon monoxide.

Example 7—2012 Dodge Ram 2500

In this example, an ionizing device as described herein was installed on a 2012 Dodge Ram 2500 with a turbo diesel engine. The vehicle was evaluated using a dynamometer.

TABLE 7

Performance Evaluation with Dodge Ram

|  | Without Device | With Device |
|---|---|---|
| Hydrocarbons (HC) | N/A | 0 |
| Carbon monoxide (CO) | N/A | 0.03 |
| Carbon dioxide ($CO_2$) | N/A | 2.6 |
| Oxygen ($O_2$) | N/A | 16.8 |
| Nitrogen oxides (NOx) | N/A | 0 |
| Fuel efficiency (miles per gallon) | 13.8 | 18.3 |

The results in Table 7 show an appreciable improvement in fuel efficiency. Additionally drivers reported an elimination of the "turbo lag" when the ionizing device was installed.

Example 8—2016 Toyota Corolla

In this example, an ionizing device as described herein was installed on a 2016 Toyota Corolla. The vehicle was evaluated under normal driving conditions, both city and highway with and without the device.

TABLE 8

Results for Toyota Corolla

| Without Device | | With Device | |
|---|---|---|---|
| City MPG | Highway MPG | City MPG | Highway MPG |
| 23 | 24.3 | 35.6 | 47.2 |

The EPA sticker listed the miles per gallon (mpg) at 28 for city and 37 for highway. Without the device, the vehicle averaged 23 mpg city and 24.3 mpg highway. The results in Table 8 show an appreciable improvement in fuel efficiency.

Example 9—2016 Hyundai Genesis EQ 900

In this example, an ionizing device as described herein was installed on a 2016 Hyundai Genesis EQ 900. The vehicle was evaluated with and without the device.

TABLE 9

Results for Hyundai Genesis at 800 RPM

|  | Without Device | With Device |
|---|---|---|
| Hydrocarbons (HC) | 21 ppm | 0 ppm |
| Carbon monoxide (CO) | 0.043% | 0.020% |
| Carbon dioxide ($CO_2$) | 14.7% | 14.55% |

TABLE 9-continued

Results for Hyundai Genesis at 800 RPM

|  | Without Device | With Device |
|---|---|---|
| Oxygen ($O_2$) | 0.27% | 0.18% |
| Nitrogen oxides (NOx) | 41 ppm | 0 ppm |
| Fuel efficiency (miles per gallon) | 4.6 | 4.7 |

The results in Table 9 show and appreciable improvement in vehicle emissions.

Example 10—2015 Chevy Cruz 1.4 Turbo

In this example, an ionizing device as described herein was installed on a 2015 Chevy Cruz 104 Turbo. The vehicle was evaluated with and without the device.

TABLE 10

Results for Chevy Cruz 2,000 RPM

|  | Without Device | With Device |
|---|---|---|
| Hydrocarbons (HC) | 28 ppm | 18 ppm |
| Carbon monoxide (CO) | 0.051% | 0.038% |
| Carbon dioxide ($CO_2$) | 14.44% | 14.11% |
| Oxygen ($O_2$) | 0.28% | 1.43% |
| Nitrogen oxides (NOx) | 0 ppm | 0 ppm |
| Fuel efficiency (miles per gallon) | 6.7 | 7.4 |

The results in Table 10 show and appreciable improvement in vehicle emissions.

Example 11—2012 Kia K7

In this example, an ionizing device as described herein was installed on a 2012 Kia K7. The vehicle was evaluated with and without the device.

TABLE 11

Results for Kia K7 at 800 RPM

|  | Without Device | With Device |
|---|---|---|
| Hydrocarbons (HC) | 228 ppm | 0 ppm |
| Carbon monoxide (CO) | 0.121% | 0.020% |
| Carbon dioxide ($CO_2$) | 14.79% | 14.55% |
| Oxygen ($O_2$) | 0.26% | 0.18% |
| Nitrogen oxides (NOx) | 3 ppm | 0 ppm |
| Fuel efficiency (miles per gallon) | N/A | N/A |
| Power (0-100M) | 7.4 seconds | 7.3 seconds |
| Power 1.4 KM | 7.2 seconds | 6.9 seconds |

The results in Table 11 show and appreciable improvement in vehicle emissions.

Example 12—2014 Ssangyong Korando Sports

In this example, an ionizing device as described herein was installed on a 2014 Ssangyong Korando Sports. The vehicle was evaluated with and without the device.

TABLE 12

Results for Ssangyong Korando Sports

|  | Without Device | With Device |
|---|---|---|
| Fuel efficiency (miles per gallon) | 3.94 | 4.42 |
| Power (0-100M) | 98 km | 90 km |
| Noise - engine room | 78 db | 76.5 db |
| Noise - key on (in door) | 69 db | 64.5 db |
| Noise - driving (in door) | 73 db | 68.0 db |
| Top speed | ~90 | ~97 |

The results in Table 12 show and appreciable improvement in vehicle performance.

The examples set forth above are provided to give those of ordinary skill in the art a complete disclosure and description of how to make and use embodiments of the compositions, and are not intended to limit the scope of what the inventors regard as their invention. Modifications of the above-described modes (for carrying out the invention that are obvious to persons of skill in the art) are intended to be within the scope of the following claims. All publications, patents and patent applications cited in this specification are incorporated herein by reference as if each such publication, patent or patent application were specifically and individually indicated to be incorporated herein by reference.

What is claimed is:

1. An ionizing device comprising:
   a housing unit comprising a bowl; a cap; and wherein the bowl and the cap each have an interior surface and an exterior surface;
   an electrode attached to the interior surface of the cap, wherein the electrode includes a hollow portion and has an interior surface and an exterior surface, and wherein a portion of the electrode is covered with a metal oxide coating;
   an air intake port;
   an air outtake port;
   a third port; and
   a power source connector, wherein the power source connector connects the electrode to a positive terminal of a power source, and wherein the power source connector passes through the third port;
   wherein the air outtake port is connected to a vacuum line.

2. The device of claim 1, wherein the device is configured to provide for unilateral air flow through the housing, and wherein air enters the hollow portion of the electrode and passes through the interior surface and the exterior surface of the electrode.

3. The device of claim 1, wherein the electrode is made from a conductive metal or a conductive metal alloy.

4. The device of claim 3, wherein the electrode is made from a conductive micromesh metal or a conductive micromesh metal alloy.

5. The device of claim 4, wherein the electrode is made from sintered bronze.

6. The device of claim 1, wherein the metal oxide coating includes a metal is selected from the group consisting of: aluminum, silver, titanium, magnesium, zinc, copper, nickel, gold, tin, chromium, tungsten, molybdenum, lithium, and palladium.

7. The device of claim 6, wherein the metal oxide coating includes aluminum.

8. The device of claim 1, wherein the power source connector is a wire.

9. The device of claim 8, wherein the wire attaches to the device using a male/female adaptor.

10. The device of claim 1, wherein the air intake port is connected to an air filter.

11. The device of claim 1, wherein the air intake port is connected to a forced air line.

12. The device of claim 1, further comprising a light, wherein the light turns on when the device is properly attached to the power source.

13. A device for improving the performance of an internal combustion engine comprising:
    a housing;
    an electrode mounted in the housing;
    wherein the electrode comprises a mesh structure;
    wherein the housing includes an air intake port and an air outtake port;
    wherein the device is configured so that air enters the housing through the air intake port and passes through the mesh structure and exits the housing the air outtake port and is thereby provided to an intake of the internal combustion engine.

14. The device of claim 13, wherein the mesh structure comprises a frustoconically shaped structure and wherein the device is configured so that air entering the housing enters the bottom of the frustoconically shaped structure and exits through the side wall of the frustoconically shaped structure.

15. The device of claim 13, wherein the device is configured so that the air exiting the housing includes a plasma.

16. The device of claim 13, wherein the mesh structure includes an oxide coating.

17. The device of claim 16, wherein the mesh structure comprises bronze material coated with aluminum oxide.

18. The device of claim 13, wherein the device improves engine performance by lowering emissions, improving fuel efficiency, reducing turbo lag, increasing power, reducing engine deposits, or reducing noise.

19. The device 18, wherein lowering emissions includes lowering hydrocarbons, carbon monoxide, nitrogen oxides, or particulate matter.

* * * * *